(12) United States Patent
Nakashima et al.

(10) Patent No.: US 8,170,696 B2
(45) Date of Patent: May 1, 2012

(54) PROCESS CONTROL SIMULATOR AND PROCESS CONTROL SIMULATING METHOD

(75) Inventors: Yasuhiro Nakashima, Hitachi (JP); Yoshio Maruyama, Mito (JP); Hideki Hanami, Hitachi (JP); Sunao Masunaga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1011 days.

(21) Appl. No.: 12/053,727

(22) Filed: Mar. 24, 2008

(65) Prior Publication Data

US 2008/0243283 A1 Oct. 2, 2008

(30) Foreign Application Priority Data

Mar. 26, 2007 (JP) ................................. 2007-078803

(51) Int. Cl.
*G05B 13/02* (2006.01)
(52) U.S. Cl. ............................... 700/31; 700/30; 700/47
(58) Field of Classification Search ................ 700/1, 29, 700/47–51, 97, 30–31
See application file for complete search history.

(56) References Cited

U.S. PATENT DOCUMENTS

| 4,555,756 A | 11/1985 | Yamanaka |
| 6,445,963 B1 * | 9/2002 | Blevins et al. ................... 700/44 |
| 2004/0117763 A1 * | 6/2004 | Fjallstrom et al. ............ 717/108 |
| 2004/0163380 A1 * | 8/2004 | Yasui .............................. 60/285 |

FOREIGN PATENT DOCUMENTS

| JP | 58-084305 | 5/1983 |
| JP | 59-229620 | 12/1984 |
| JP | 4-342289 | 11/1992 |
| JP | 9-034534 | 2/1997 |
| JP | 2005-070161 | 3/2005 |

* cited by examiner

*Primary Examiner* — Michael D Masinick
*Assistant Examiner* — Carlos Ortiz Rodriguez
(74) *Attorney, Agent, or Firm* — Antonelli, Terry, Stout & Kraus, LLP.

(57) ABSTRACT

This invention provides a process control simulator configured to efficiently debug a plant control system. A computer stores simulated data generated by a model executing part to a time-series memory area. A programmable controller stops input from the input-device interface when there is a virtual input/output request received. A virtual input/output processor sets simulated data from a time-series memory area of the computer to a time-series memory area of the programmable controller. A program executing part sets simulated data from the time-series memory area to a memory area at the same resolution as an arithmetic operation period of program execution and executes the program. Control output as a result of the execution is fed back to the model executing part of the computer, and the computer calculates simulated data as process value at this timing, and stores the data to its time-series memory area.

6 Claims, 4 Drawing Sheets

PROCESS CONTROL SIMULATOR AND PROCESS CONTROL SIMULATING METHOD

BACKGROUND OF THE INVENTION

The invention relates to a process control simulator and a process control simulating method capable of simulating the behavior of a real plant even in the absence of a real plant and an input/output device of a process control system.

As disclosed in JP-A-59-229620, there is known an apparatus that processes data which is directly supplied to its processor without the intermediary of the interface devices in a plant control system, including interface devices for exchanging data between the process side and the process control system side.

With regard to the action of a real plant, by a control output of the process control system, the condition of the real plant changes and the process value changes. However, in simulator, such as described in JP-A-59-229620, only preset data, such as data, can be input, and it has been impossible to set input values to be fed back by control output.

SUMMARY OF THE INVENTION

The object of the present invention is to overcome the problems in the relative art, feed back a process value as the result of an arithmetic operation on a plant model, and provide a process control simulator that has an improved debugging efficiency in a system, including a real plant.

According to an aspect of the present invention that achieves the above objects, there is provided a process control simulator that comprises a simulated data calculation system and a plant control system, mutually communicating with each other through communication interfaces, wherein the simulated data calculation system includes a plant model executing part for simulating the behavior of a real plant and a memory area for storing, in time-series fashion, data to be input to the plant control system, and the plant control system includes a program executing part for executing a plant control program, a memory area for storing data used as referring objects when the plant control program is executed and data used as setting objects resulting from program execution, and a memory area for storing, in time-series fashion, data used as referring objects when the plant control program is executed, and wherein on condition that a request to perform a predetermined operation is received, data in the memory in the simulated data calculation system is stored in the memory area on the plant control system, some of this data is transferred to the memory area for execution of the program by the program executing part, and the contents of the memory area that stores data resulting from program execution by the program executing part are output to the plant model executing part in the simulated data calculation system. The above-mentioned condition that a request to perform a predetermined operation is received is a case where a virtual input or output request is made to the plant control system, for example.

According to another aspect of the present invention, the plant control system stores data for one step in the time-series memory area on the plant control system in the memory area on the plant control system at the same resolution as an arithmetic operation period of the program executing part.

According to still another aspect of the present invention, data resulting from the program execution of the program executing part is output to the plant model executing part in the simulated data calculation system, and the plant model executing part accepts the data at the same resolution as the arithmetic operation period of the program executing part.

According to a still further aspect of the present invention, the plant control system includes an input interface to receive input data from the plant and an output interface to output control output resulting from an arithmetic operation by the program executing part, and these interfaces become operable when there is not the condition that a request to perform the predetermined operation is received.

The present invention is suitable for debugging a program installed in the plant control system (programmable controller). More specifically, it is possible to input time-series data generated by a simulation control system (computer) to the programmable controller, also input control information resulting from the arithmetic operation in the programmable controller to the plant model of the computer that simulates the behavior of the real plant, and again feed back a process value resulting from arithmetic operation in the plant model to the programmable controller. Therefore, it is possible to debug the programmable controller taking into consideration the behavior of the whole system without using the real plant or its related devices, thus enabling improvement of the debugging efficiency in the development of the programmable controller.

Other objects, features and advantages of the invention will become apparent from the following description of the embodiments of the invention taken in conjunction with the accompanying drawings.

DETAILED DESCRIPTION OF THE EMBODIMENTS

Figure 1:
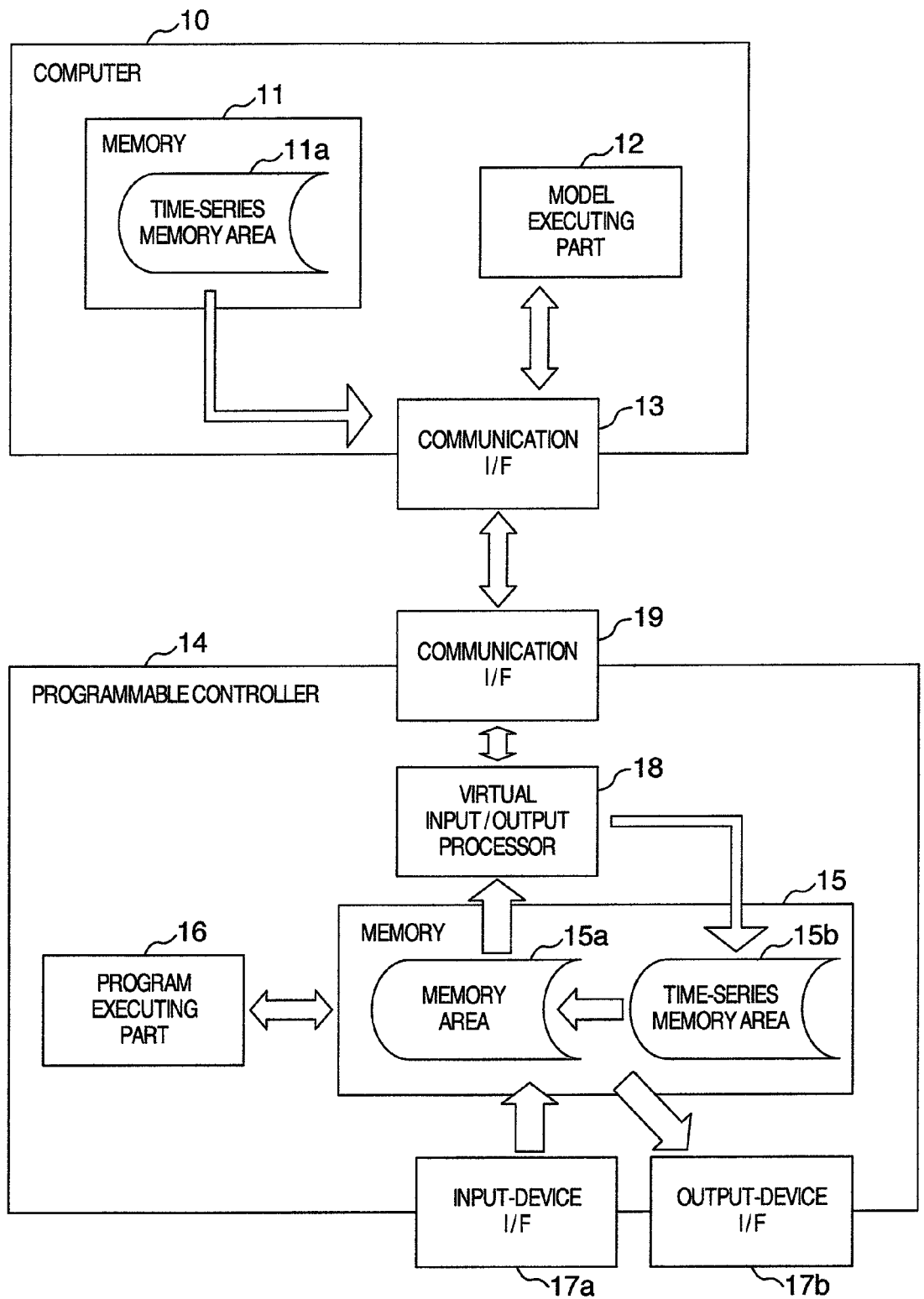
FIG. 1 is a configuration diagram of a process control simulator according to an embodiment of the present invention.

The process control simulator according to the present invention is configured to include a simulation control system (computer) and a process control system (programmable controller) interconnected through communication interfaces, the simulated data calculation system supplying the process control system with simulated data and the process control system executing a control program using simulated data from the computer.

The simulated data calculation system (computer) includes a time-series memory area for storing, in time-series fashion, data to be input to the programmable controller, a plant model executing part that simulates the behavior of the real plant, and a communication interface.

The programmable controller includes a program executing part for executing a plant control program, a memory area for storing data used as referring objects when the program is executed or data used as setting objects resulting from execution of the program, and a time-series memory area for storing, in time-series fashion, data used as referring objects when the program is executed. The programmable controller further includes an input-device interface for storing data from an input/output device to the memory area, an output-device interface for sending data from the memory area to the input/output device, and a communication interface with the computer.

Furthermore, the programmable controller includes a unit for disabling the input device interface and a unit for storing and a unit for storing data from the time-series memory of the computer through the communication interface to the time-series memory area on condition that a request to perform a predetermined operation is received (there is a virtual input/output request received). The programmable controller also includes a unit for storing contents for one step of the time-series memory area to the memory area at the same resolution as the arithmetic operation period in the program executing part on condition that a request to perform a predetermined operation is received. The programmable controller further includes a unit for storing contents of the memory area, where data used as setting objects from the program executing part is stored, to the computer's plant model executing part through the communication interface on condition that a request to perform a predetermined operation is received.

Being configured as described, the process control simulator according to the present invention can input, in time-series fashion, virtual data (simulated data) generated by the computer to the programmable controller. Even in the absence of the real plant, the behavior of the plant based on control information obtained from the arithmetic operation in the process control system (programmable controller) can be fed back to the computer, and the virtual data is again simulated in the computer, and process values thus obtained are fed back to the programmable controller. Therefore, it is possible to debug the programmable controller easily in consideration of the behavior of the whole system, and it is also possible to enhance the debugging efficiency in the development of the programmable controller.

Preferable embodiments of the present invention will be described in detail with reference to the drawings. FIG. 1 shows a process control simulator according to the present invention, which has a system configuration including a programmable controller and a computer.

The computer 10 generates input data and implements a plant model, and communicates with the programmable controller 14. In the computer 10, a memory 11 stores input and output values and programs to be executed by the model executing part 12. A time-series memory area 11a stores data used as referring objects when a control process is execution and data used as setting objects resulting from the process execution. A plant model executing part 12 simulates the behavior of the real plant. A communication interface 13 enables communication with the programmable controller 14.

Figure 2:
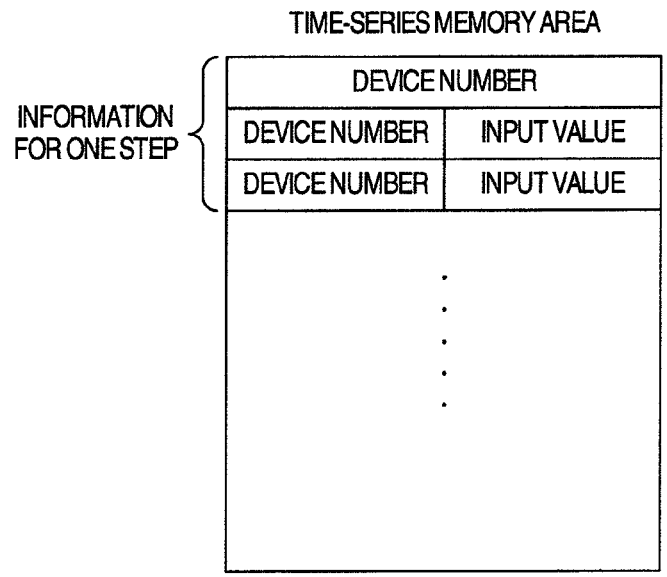
FIG. 2 is a structure diagram of a time-series memory area according to an embodiment of the present invention.

FIG. 2 shows a structure of a time-series memory area 11a, in which under the heading of device number, contents of information for one step, including device numbers and input values, are stored. As will be described later, a program executing part 16 takes in information for one step at the same resolution as the arithmetic operation period of the program executing part 16.

The programmable controller 14 executes a program and input output processes, and communicates with the computer 10. A memory 15 stores a program and input and output values, and includes a memory area 15a for storing data used as referring objects when a program is executed and data used as setting values resulting from the program execution, and a time-series memory area 15b for storing, in time-series fashion, data used as referring objects when the program is executed.

The program executing part 16 reads values of referring objects stored in the memory area 15a, executes a program, and stores the values of setting objects resulting from the program execution into the memory area 15a. The input-device interface 17a sets data received from the input device in the referring object section of the memory area 15a. The output-device interface 17b sends a value from a setting object section of the memory area 15a to the output device.

The virtual input/output processor 18 disables the input-device interface 17a on condition that a request to perform a predetermined operation is received (there is a virtual input request received), and at the same time sets contents for one step of the time-series memory area 15b are set in the referring object section of the memory area 15a at the same resolution as the same arithmetic operation period of the program executing part 16. The communication interface 19 enables communication with the computer 10 and stores contents of the time-series memory area 11a of the computer 10 in the time-series memory area 15b of the programmable controller 14.

Figure 3:
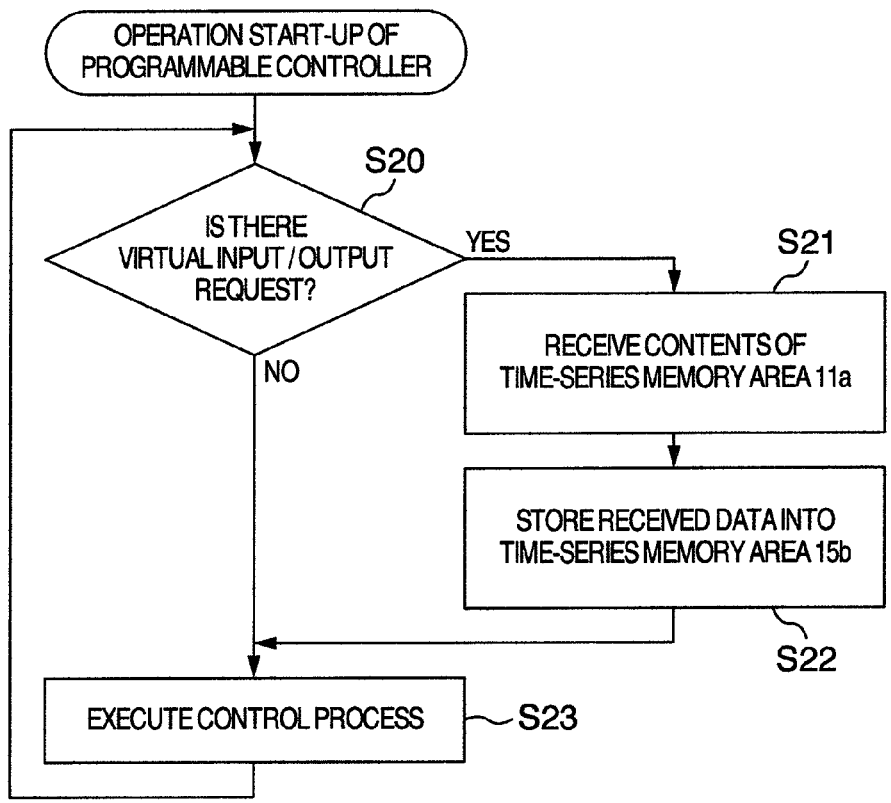
FIG. 3 is a flowchart showing the operation of the programmable controller according to an embodiment of the present invention.

FIG. 3 is a flowchart showing the operation of an input process in the programmable controller. An input process starts to work the moment the programmable controller 14 starts to execute a program. Initially, the program executing part 16 decides if there is a virtual input request in step S20, and if there is a virtual input request received, causes the virtual input/output processor 18 to perform a virtual input/output process. In step S21, the virtual input/output processor 18 receives predetermined data in the time-series area 11a of the computer (DI values such as, ON/OFF of a switch and AI values, such as voltage, for example) and process values as calculation results from the plant model through the communication interface 19, and also stores data received in step S22 to the time-series memory area of the programmable controller 14. After this, the program executing part 16 executes a control process in step S23.

Figure 4:
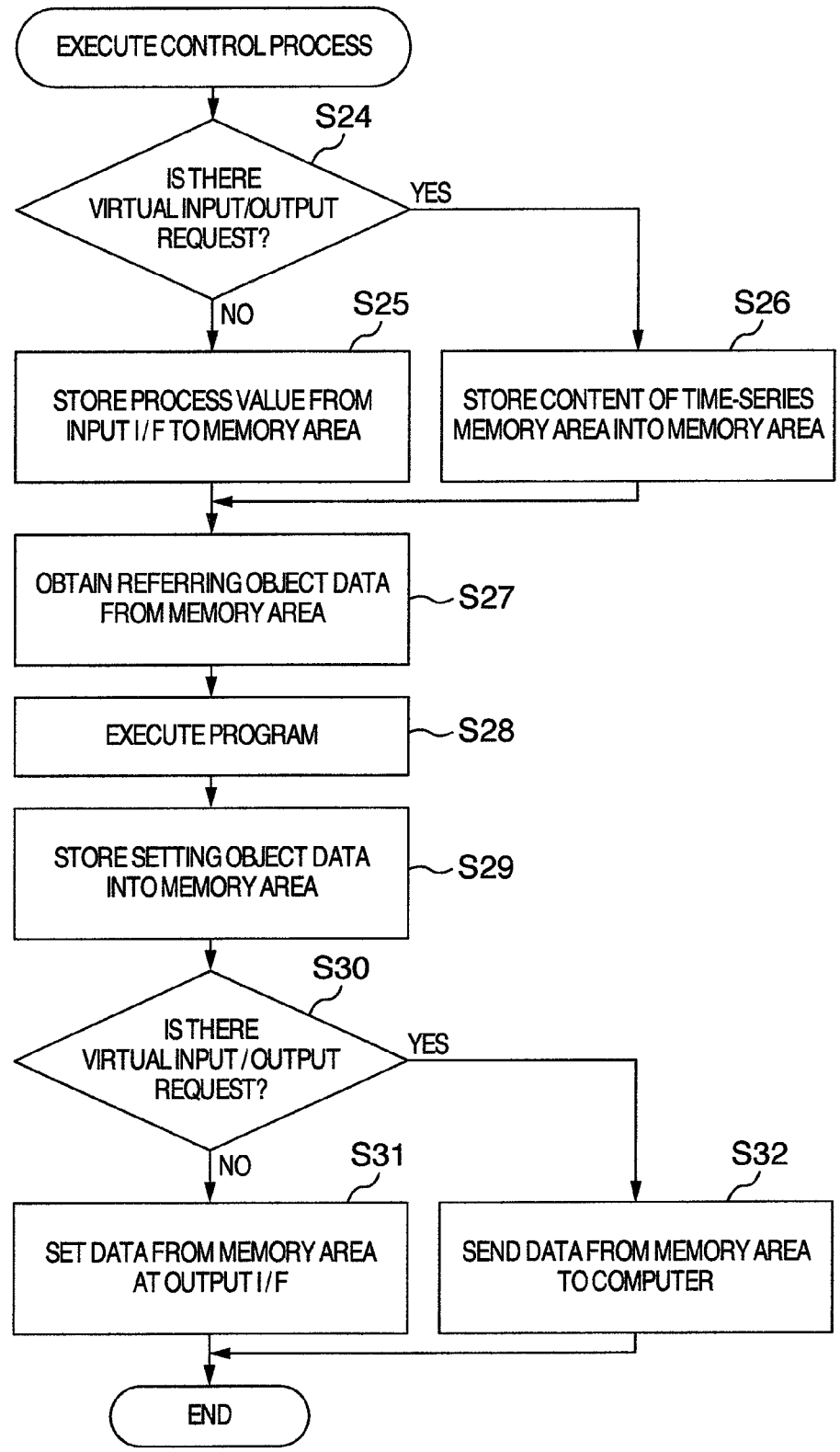
FIG. 4 is a flowchart showing the operation of the program executing part according to an embodiment of the invention.

FIG. 4 is a flowchart showing the operation of the program executing part 16. The program executing part 16 starts to execute a program when the execution of a control process starts to proceed. The program executing part 16 decides if there is a received virtual input/output request in step S24 and if there is not a virtual input/output request, stores process values in the memory area 15a through the input-device interface 17A in step S25. In step S24, if there is a received virtual input/output request, in step S26, the program executing part 16 stores contents of the time-series memory area 15b to the memory area 15a.

Then, in step S27, the program executing part 16 reads a value of a referring object stored in the memory area 15a, in step S28 executes the program, and in step S29 stores the value of a setting object resulting from the program execution to the memory area 15a.

Then, in step S30, the program executing part 16 decides if there is a virtual input/output request, and if there is not a virtual input/output request, in step S31 outputs control information through the output-device interface 17b. If there is a virtual input/output request in step S30, the program executing part 16 in step S32 outputs control information through the communication interface 19 to the plant model in the computer 10, and the model executing part 12 again simulates the behavior of the plant based on this control information and stores simulated data resulting from the simulation to the memory 11. At this time, the model executing part 12 takes in the control information at the same resolution as the arithmetic operation period of the program executing part 16 and performs an arithmetic operation to obtain the control information.

Figure 5A:
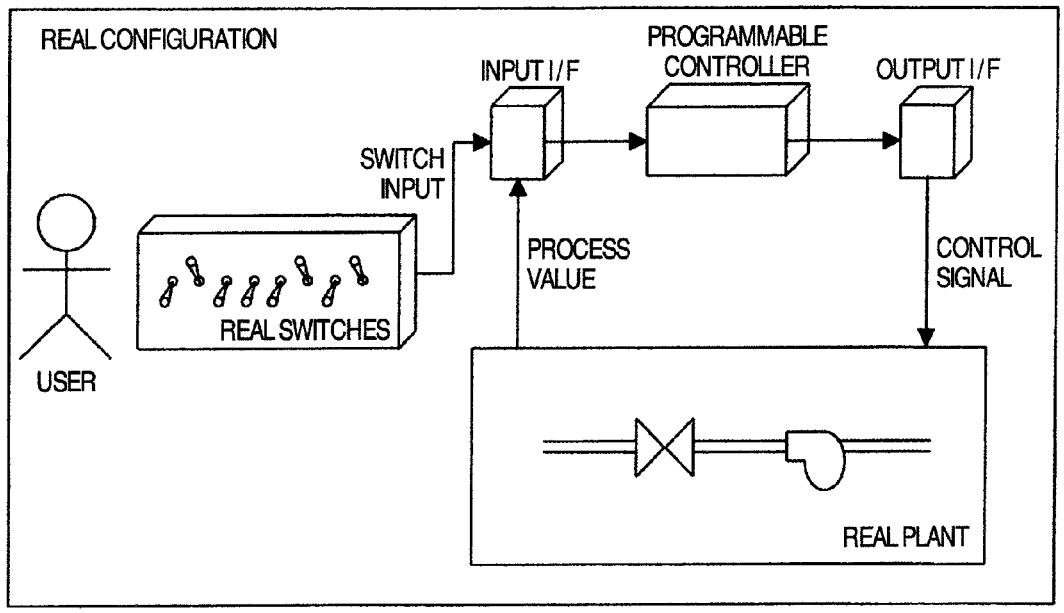
FIGS. 5A and 5B are configuration diagrams for comparison between a real plant and a process control simulator.
Figure 5B:
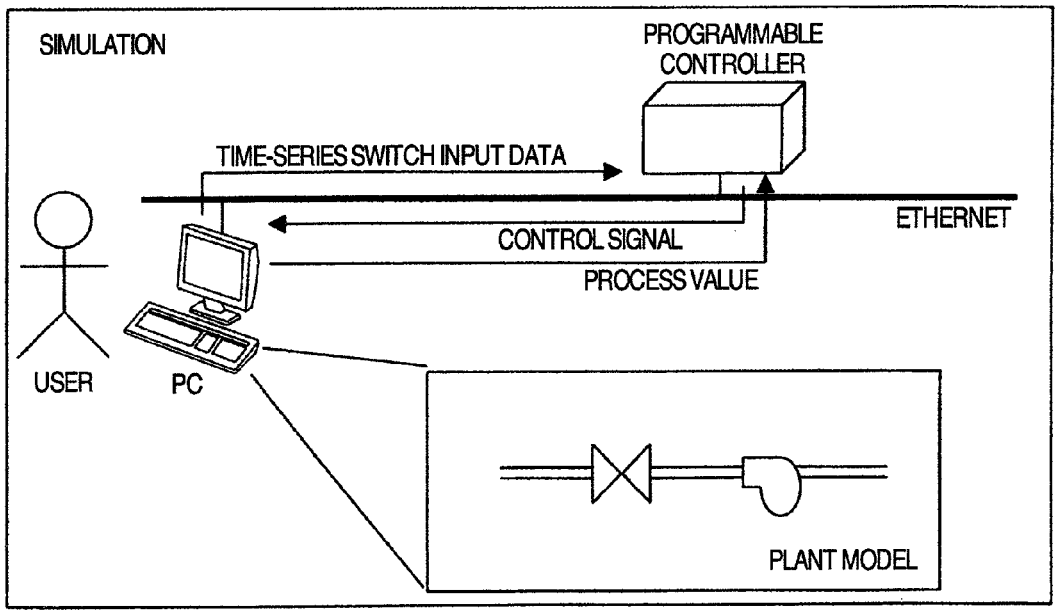

FIGS. 5A and 5B are schematic diagrams of comparison between the real plant and the simulator. FIG. 5A shows the configuration of the real plant, in which input entered on the operation panel by a user is sent through the input interface to the programmable controller. The programmable controller performs an arithmetic operation on the input data and outputs control signals resulting from the arithmetic operation. In the real plant, in response to control signals, the devices such as a pump and valves operate, so that the process values will change. The process values are received from the input interface to continue control.

FIG. 5B shows the configuration of the control simulator, in which initial input signals corresponding to the switches on the real plant are generated by the computer, and input through a transmission line to the programmable controller. The programmable controller performs an arithmetic operation based on those input signals, and inputs a simulated control signal resulting from the arithmetic operation to the plant model in the computer. The plant model simulates the behavior of the real plant based on simulated control signals, and inputs process values as results of the arithmetic operation to the programmable controller and continues simulation control.

As has been described, according to the control simulator of the present invention, even in the absence of the real plant and input/output devices, it is possible to debug the plant control system efficiently, and therefore it is possible perform debugging in a short time regardless of process changes over a prolonged period of time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A process control simulator, comprising:
a simulated data calculation system;
and a plant control system,
wherein the simulated data calculation system and the plant control system are mutually communicated with each other through at least one communication interface;
wherein the simulated data calculation system includes a plant model executing part for simulating behavior of a real plant and a first time-series memory area for storing simulated data in time-series fashion, the simulated data being a process value calculated by the plant model executing part;
wherein the plant control system includes a real programmable controller including:
a program executing part for executing a program for control of the real plant,
a referring-setting memory area for storing the simulated data from the first-time series memory, and for storing control data generated by the execution of the program, wherein the simulated data stored in the referring-setting memory area is referred to by the program executing part for the execution of the program, wherein the control data is generated based on the simulated data and on a calculation result from the program,
a second time-series memory area for storing the simulated data from the first time-series memory area,
an input-device interface for storing process data received from an input/output device (PI/O) of the real plant into said referring-setting memory area, and
an output-device interface for transmitting the control data from said referring-setting memory area to the input/output device (PI/O);
wherein the plant control system further includes a virtual input/output processor which is configured, if a virtual input/output request for accepting a predetermined operation from the simulated data calculation system, to deactivate the input-device interface and not accept data from the input/output device, store the simulated data from the first time-series memory area into the second time-series memory area, store the simulated data stored in the second time-series memory area into said referring-setting memory area, and transmit the control data from said referring-setting memory area to the plant model executing part through the at least one communication interface to activate the plant model executing part;
wherein the plant control system is configured, if the virtual input/output processor accepts the input/output request, to store the simulated data from the first time-series memory area to the second time-series memory area, execute the program, and output the control data generated by the program executing part through the at least one communication interface to the plant model executing part; and
wherein the plant model executing part is configured, when the virtual input/output processor accepts the input/output request, to simulate the behavior of the real plant, generate the simulated data based on the control data, and store the simulated data into the first time-series memory area.

2. The process control simulator according to claim 1, wherein the plant control system stores data for one step in the second time-series memory area on the plant control system to the referring-setting memory area on the plant control system, at a same resolution as an arithmetic operation period of the program executing part.

3. The process control simulator according to claim 1, wherein data resulting from the program execution of the program executing part is output to the plant model executing part in the simulated data calculation system, and wherein the plant model executing part accepts the data resulting from the program execution of the program executing part at a same resolution as an arithmetic operation period of the program executing part.

4. The process control simulator according to claim 1, wherein the plant control system includes an input interface to receive input data from the plant and an output interface to output control output resulting from an arithmetic operation by the program executing part, and wherein the input interface and output interface become operable when there is not a condition that a request to perform a predetermined operation is received.

5. The process control simulator according to claim 1, wherein a condition that a request to perform a predetermined operation is received, is a case where a virtual input or output request is made to the plant control system.

6. A process control simulating method effected within a process control simulator including:
a simulated data calculation system;
and a plant control system, wherein the simulated data calculation system and the plant control system are mutually communicated with each other through at least one communication interface;

wherein the simulated data calculation system includes a plant model executing part for simulating behavior of a real plant and a first time-series memory area for storing simulated data in time-series fashion, the simulated data being a process value calculated by the plant model executing part;

wherein the plant control system includes a real programmable controller including:

a program executing part for executing a program for control of the real plant, a referring-setting memory area for storing the simulated data from the first-time series memory, and for storing control data generated by the execution of the program, wherein the simulated data stored in the referring-setting memory area is referred to by the program executing part for the execution of the program, wherein the control data is generated based on the simulated data and on a calculation result from the program, a second time-series memory area for storing the simulated data from the first time-series memory area, an input-device interface for storing process data received from an input/output device (PI/O) of the real plant into said referring-setting memory area, and an output-device interface for transmitting the control data from said referring-setting memory area to the input/output device (PI/O);

the process control simulating method comprising:

the plant control system further includes a virtual input/output processor which, responsive to a virtual input/output request for accepting a predetermined operation from the simulated data calculation system, effect operations to: deactivate the input-device interface and not accept data from the input/output device, store the simulated data from the first time-series memory area into the second time-series memory area, store the simulated data stored in the second time-series memory area into said referring-setting memory area, and transmit the control data from said referring-setting memory area to the plant model executing part through the at least one communication interface to activate the plant model executing part;

wherein the plant control system, responsive to the virtual input/output processor accepts the input/output request, effecting operations to: store the simulated data from the first time-series memory area to the second time-series memory area, execute the program, and output the control data generated by the program executing part through the at least one communication interface to the plant model executing part; and wherein the plant model executing part further effects operations of, when the virtual input/output processor accepts the input/output request, simulating the behavior of the real plant, generating the simulated data based on the control data, and storing the simulated data into the first time-series memory area.

* * * * *